(12) United States Patent  (10) Patent No.: US 6,604,865 B2
Bruland et al.  (45) Date of Patent: Aug. 12, 2003

(54) OPTICAL PLUG-IN CONNECTOR HAVING OPTICAL WAVEGUIDES HELD IN FERRULES FOR THE PLUGGABLE CONNECTION TO A COUNTERPLUG

(75) Inventors: Alexander Bruland, Rahden (DE); Wolfgang Essrich, Hilden (DE); Graham Tickle, Stamford (GB)

(73) Assignee: Harting Automotive GmbH & Co. KG (DE)

( * ) Notice: Subject to any disclaimer, the term of this patent is extended or adjusted under 35 U.S.C. 154(b) by 0 days.

(21) Appl. No.: 10/047,697

(22) Filed: Jan. 15, 2002

(65) Prior Publication Data

US 2002/0094173 A1 Jul. 18, 2002

(30) Foreign Application Priority Data

Jan. 17, 2001 (DE) .......................... 101 01 812

(51) Int. Cl.$^7$ ................................. G02B 6/36
(52) U.S. Cl. ................ 385/78; 385/140; 385/77; 385/78; 385/56; 385/53
(58) Field of Search .................. 385/140, 139, 385/77, 78, 73, 70, 60, 56, 53

(56) References Cited

U.S. PATENT DOCUMENTS

| 5,574,812 A | 11/1996 | Beier et al. .................. 385/78 |
| 6,102,581 A | 8/2000 | Deveau et al. ............... 385/56 |

Primary Examiner—Javaid Nasri
(74) Attorney, Agent, or Firm—Hayes Soloway P.C.

(57) ABSTRACT

For optical waveguide connections that can be freely laid for transmitting optical signals, there is proposed, in accordance with the dimensions specified by the MOST Co-operation of the automobile manufacturers, a releasably formed optical plug-in connector for an modular connector system that comprises two casing parts that can be inserted in one another. In this connection, there is inserted in a casing a mounting part that receives optical waveguides provided with ferrules, wherein the ferrules of the optical waveguides are provided with a reference surface.

A defined distance for an optimized signal transmission from the end face of the optical waveguides reaches by a stop of said reference surface when assembled with a reference surface of a counterplug.

6 Claims, 6 Drawing Sheets

OPTICAL PLUG-IN CONNECTOR HAVING OPTICAL WAVEGUIDES HELD IN FERRULES FOR THE PLUGGABLE CONNECTION TO A COUNTERPLUG

BACKGROUND OF THE INVENTION

1. Field of the Invention

The invention relates to an optical plug-in connector having optical waveguides held in ferrules for the pluggable connection to a counterplug.

Optical plug-in connectors are needed for the mechanical and optical connection of optical waveguides for an interference-immune transmission of analog and/or digital signals at high data transmission rates in the communications engineering sector.

It is known to connect together optical waveguides having a plug and counterplug, or having an expensive combination of plug-coupling-plug together.

2. Prior Art

U.S. Pat. No. 6,102,581 discloses an optical adapter having ferrules that can be plugged together, in which ferrules for coupling optical waveguides are held in specially manufactured ferrule casings that are in turn plugged together in an adapter casing, it being possible to combine ferrules of different size with one another.

Furthermore, U.S. Pat. No. 5,674,812 describes a mounting for optical plug-in connectors in which two separate optical plug-in connectors are latchably combined in one mounting.

In this connection, in the known optical plug-in connectors, the arrangement of the fiber end sleeves and their mounting in a plug casing have to be matched precisely to one another for correct plugging with minimal signal attenuation, it being necessary to take account of the error tolerances of the plug-in connector casing and also the fiber end sleeves during manufacture.

BRIEF SUMMARY OF THE INVENTION

The object of the invention is therefore to develop an optical plug-in connector of the type mentioned at the outset so as to reduce the error tolerances necessary for a minimum signal attenuation in the arrangement of fiber end sleeves provided with optical waveguides in a plug casing and in a counterplug to a minimum extent.

This object is achieved by a plug-in connector wherein the plug-in connector has a mounting part for at least one optical waveguide held in a ferrule, wherein the ferrule has a reference surface formed by a collar with a defined distance between the reference surface and the end face of the optical waveguide, and wherein, when the plug-in connector is plugged together with a counterplug, the reference surface comes to a stop at a reference surface of a ferrule of the counterplug, and wherein the reference surfaces are fixed in a defined distance.

The advantages achieved by the invention are firstly that the external design and the plug face of the optical plug-in connector comply with the dimensions which have been laid down by the automobile manufacturers in the so-called MOST Co-operation, are compatible with it, but are also capable of being produced more inexpensively and is easier to manipulate during assembly.

A further advantage is in the use of optical waveguides that are provided with ferrules and that have a mechanical coding means for non-interchangeable fitting in the plug-in connector. This eliminates faulty plugging that may result in unserviceability or, under some circumstances, in a destruction of electrical components.

Furthermore, an additional pull relief for the optical waveguides via the casing is unnecessary since the fiber end sleeves are directly crimped onto the fiber and additionally onto the cladding and, consequently, the tensile forces are first convoyed to the ferrules and only then onto the plug-in connector casing. In this connection, the basic principle advantageously applied here of a body of revolution mounted in a casing for mounting an optical waveguide can also readily be extrapolated to similar variants, for example those involving an electrical conductor.

An important advantage is, however, in the direct coupling of the ferrules to one another, the reference surfaces formed by the stop of a collar relative to a defined distance from the end faces of the fiber, the ferrules held in the plug casings, being held axially against one another. In this connection, the ferrules in the counterplug are additionally provided with a compression spring that effects a constant contact pressure of the two ferrules.

Consequently, the dimensional tolerances of the plug casing that normally also enter in addition into the error consideration are eliminated relative to the signal transmission attenuation.

Because of the necessary manufacture of only two components, a mounting part for the optical waveguides provided with ferrules and a casing made by plastic injection moulding technology, an inexpensive manufacture of such optical plug-in connectors is possible.

Advantageously, the ferrules provided with coding means, which are in this case regions projecting from the cylindrical turned part of the sleeve body placed in matchingly designed, negatively shaped chambers of the mounting part in a non-interchangeable manner and held at the same time by the shaping of the chambers in the latter.

It is furthermore advantageous that the mounting part with the inserted ferrules can already be used as plug-in connector, but can also be provided with a casing depending on the field of application.

If an additional casing is used, in the case of assembly or preparation of the plug-in connector, the already advantageously prelatched parts of mounting part and casing are supplied as a single piece and completed solely by insertion of the ferrules provided with optical waveguides and, finally, latched together by further pushing into one another.

Forming two latching plugs arranged at a distance one behind the other on each side of the mounting part first achieves during the assembly a preliminary latching with the latching of the first latching lug into a recess, the two casings thereby first being held loosely together. Only after the second latching lug pair has been latched into the recesses is the mounting part audibly latched to the casing.

A further securing latching is formed in a fold-down manner on the casing. In this connection, this latching is advantageously kept open in its rest position by a hinge mechanism by means of a spring element so that the ferrules can be inserted into the mounting part without difficulty.

BRIEF DESCRIPTION OF THE SEVERAL VIEWS OF THE DRAWING

An exemplary embodiment of the invention is shown in the drawing and is explained in greater detail below. In the drawing.

DETAILED DESCRIPTION OF THE INVENTION

Figure 1:
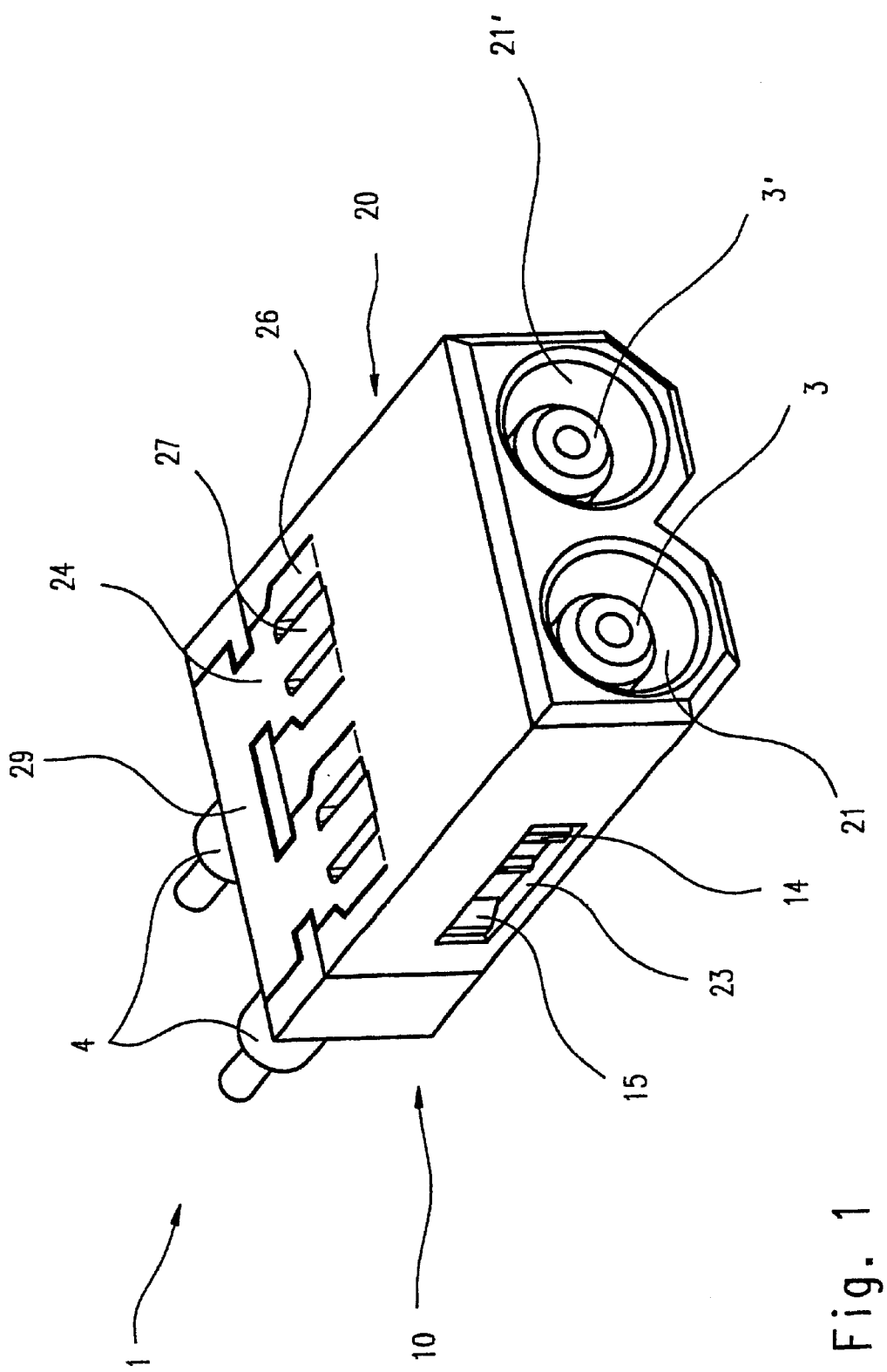
FIG. 1 shows a perspective view of an optical plug-in connector.

FIG. 1 shows a perspective view of an assembled plug-in connector 1 having a surrounding casing 20 and a mounting part 10 inserted therein in which the plug face of the plug casing is provided with fibers all round the outside edges, which fibers ensure simple insertion into a counterplug.

Inside the plug face, ferrule 3, 3' with optical waveguide 4 held therein can be discerned in two cylindrical recesses.

Figure 2A:
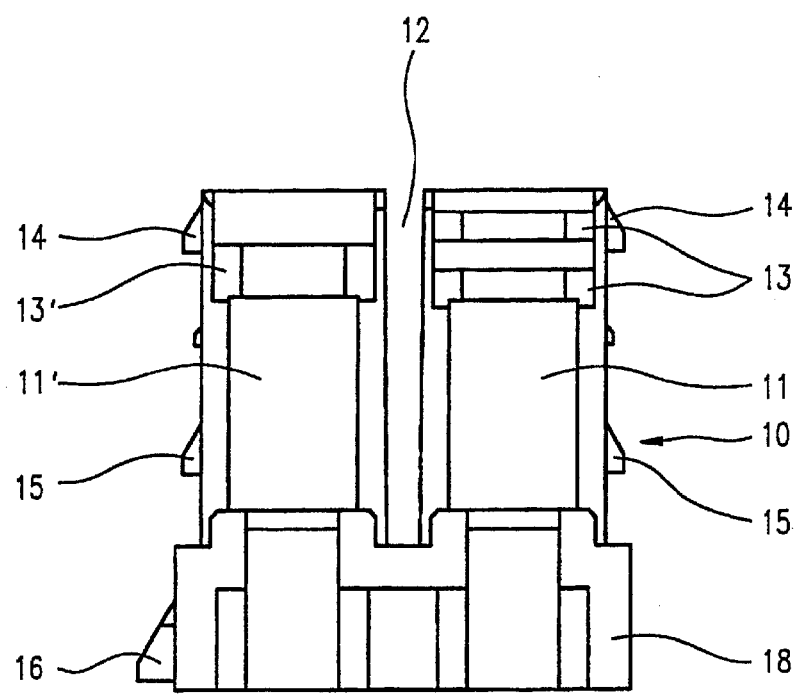
FIG. 2a shows a plan view of a mounting part of the plug-in connector.

FIG. 2a shows a plan view of the mounting part 10 of the optical plug-in connector 1.

The mounting part comprises a shell structure that is formed from two mutually adjacently situated, elongated chambers 11, 11' that are also open upwards on both sides.

The internal dimensions of the differently shaped chambers match as a negative shape the ferrule 3, 3' to be inserted therein, but are so dimensioned that, when the ferrule are inserted, a pressing action is exerted on them to effect an automatic mounting of the ferrule in the chambers.

Furthermore, there are provided in the chambers 11, 11' to match the ferrule coding means that are formed in the shape of projecting ribs 13, 13' that are formed on transversely to the plug direction and that ensure an error-free assembly of the ferrules.

Provided on both sides of the outer side walls of the mounting part 10 are a plurality of latching lugs 14, 15 that each latch into a matching recess 23 in the casing 20 and in total form a first latching means.

An individual latching lug 16 formed on in the edge region of a sidewall is provided for latching the finally assembled plug-in connector to a counterplug not shown here.

Provided in the center of the mounting part between the two chambers 11, 11' is a slot 12 proceeding from the plug side and comprising at least half the casing length into which a partition 22 of the casing 20 is inserted during the assembly of the plug-in connector (FIG. 5).

Figure 2B:
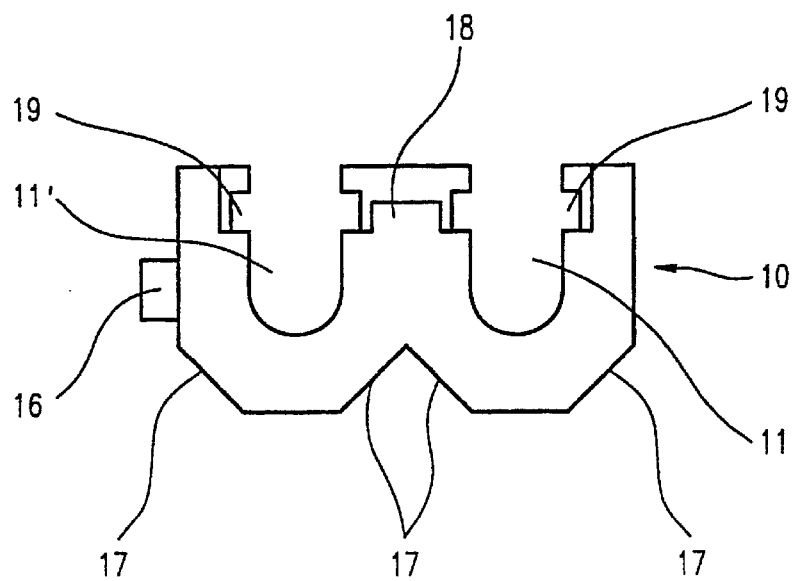
FIG. 2b shows a side view of the mounting part on the lead-in side for the optical waveguide.

FIG. 2b shows the mounting part 10 with a view onto the lead-in side 18 for the optical waveguide.

The external contours of said region 18 are offset from the front plug region (as can be seen from FIG. 5), constructed with a thicker wall and increased in height and width, since this region comes up against the wall of the casing 20 during assembly and, to that extent, has the same dimensions without a junction as the casing. Provided on both sides underneath the chambers 11, 11' on the external wall of the mounting part are symmetrically arranged 45° chamfers 17 as a polarization means that serve for the non-interchangeable plugging to the casing 20, but at the same time are also necessary as positioning means during the plugging to the counterplug not shown here.

In the region of the recesses 19, a second latching means having a latching block 25 is inserted for final latching of mounting part 10 and casing 20.

Figure 3A:
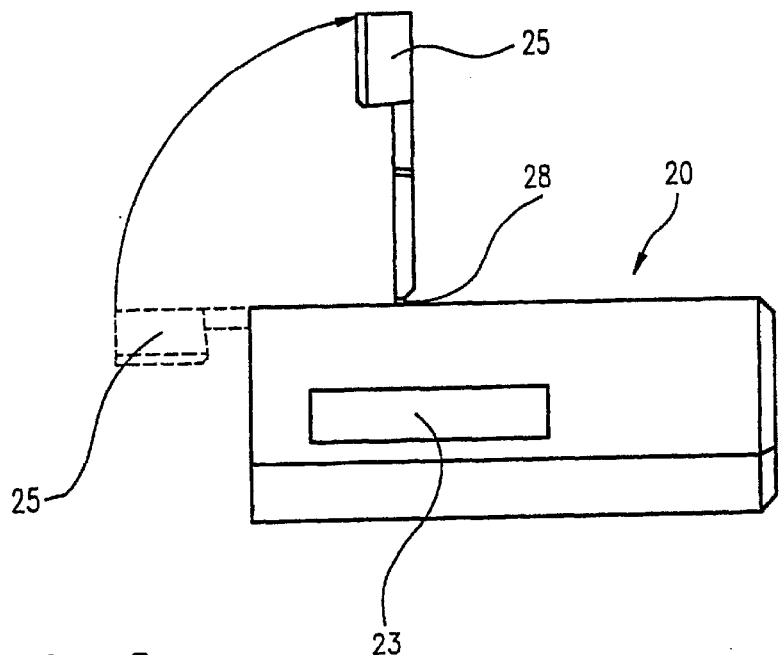
FIG. 3a shows a side view of the casing with latching means opened.

FIG. 3a shows in a side view the casing 20 with a second means for latching with the latching block 25 folded up through about 90°. On the side face, there can be perceived a rectangular recess 23 that is provided on both sides of the casing and into which, when the mounting part 10 and the casing 20 are pushed together, the latching lug pair 14 is first inserted so that mounting part and casing are latched in a preliminary manner. During further insertion, the second latching lug pair 15 audibly latches at the stop of the two parts 10, 20 (FIG. 1).

Figure 3B:
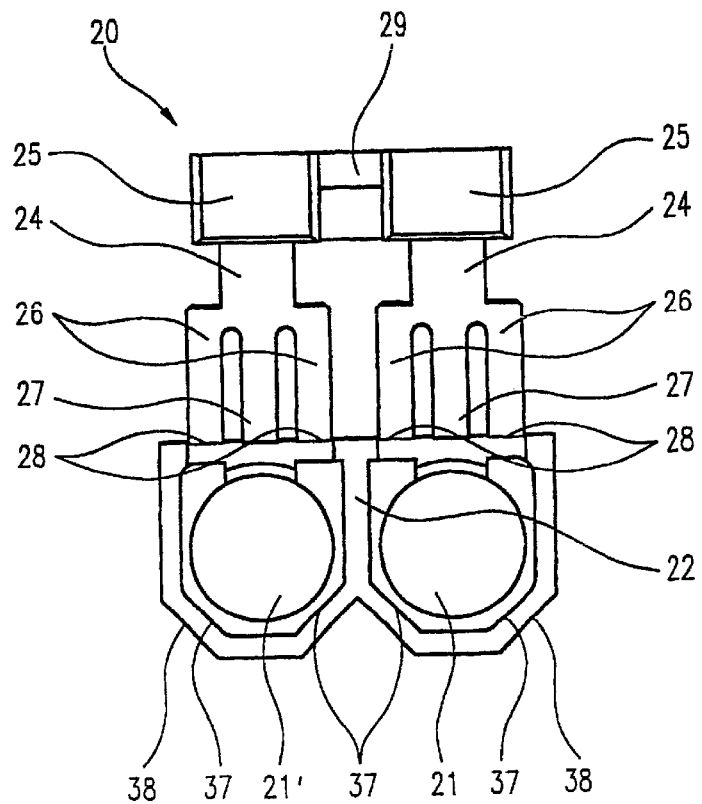
FIG. 3b shows a view of the casing on the lead-in side for the mounting part.

FIG. 3b shows the casing 20 with a view of the lead-in side for the mounting part 10.

The casing is provided as a rectangular hollow body with a central longitudinal wall 22 and has two mutually adjacently situated chambers 21, 21' open on both sides.

Underneath each of the chambers 21, 21' on both sides there are perceivable external contours 38, inclined through about 45° that, in interaction with matchingly shaped counterpieces of a counterplug not shown here, are provided as polarization to prevent incorrect plugging. Furthermore, such chamfers 37 are likewise provided inside the two chambers 21, 21' in the lead-in side for the mounting part into which the similarly shaped chamfers 17 of the mounting part 10 can be inserted.

The chambers 21, 21' are of circular design in the front plug region of the ferrules, as can already be seen from FIG. 1.

Provided above the two chambers 21, 21' the second latching means that is formed as a double latching and that is formed out of the wall of the casing 20 shown here situated at the top and is held by means of film hinges 28.

In this connection, for each chamber there is provided latching means with a latching block 25 disposed above the chamber and held together because of the small dimensions by means of a transverse joint 29 so that only one device has to be actuated to latch mounting part 10 and plug casing 20.

In total, four webs 26 are provided with film hinges 28, of which two are joined in each case by a connecting web 24 to each of which a latching block 25 is attached. Both latching blocks are joined to one another by means of the transverse joint 29.

Formed on between each of the webs 26 in the direction of the chambers 21, 21' is a spring element 27 whose end is not joined to the casing 20, but whose length extends beyond the material thickness of the casing down into the interior of the two chambers. This achieves for said latching means a hinge mechanism that holds the latching block 25 in its open rest position until the assembly of the plug-in connector has been completed or the latching means is folded down if necessary.

Figure 4:
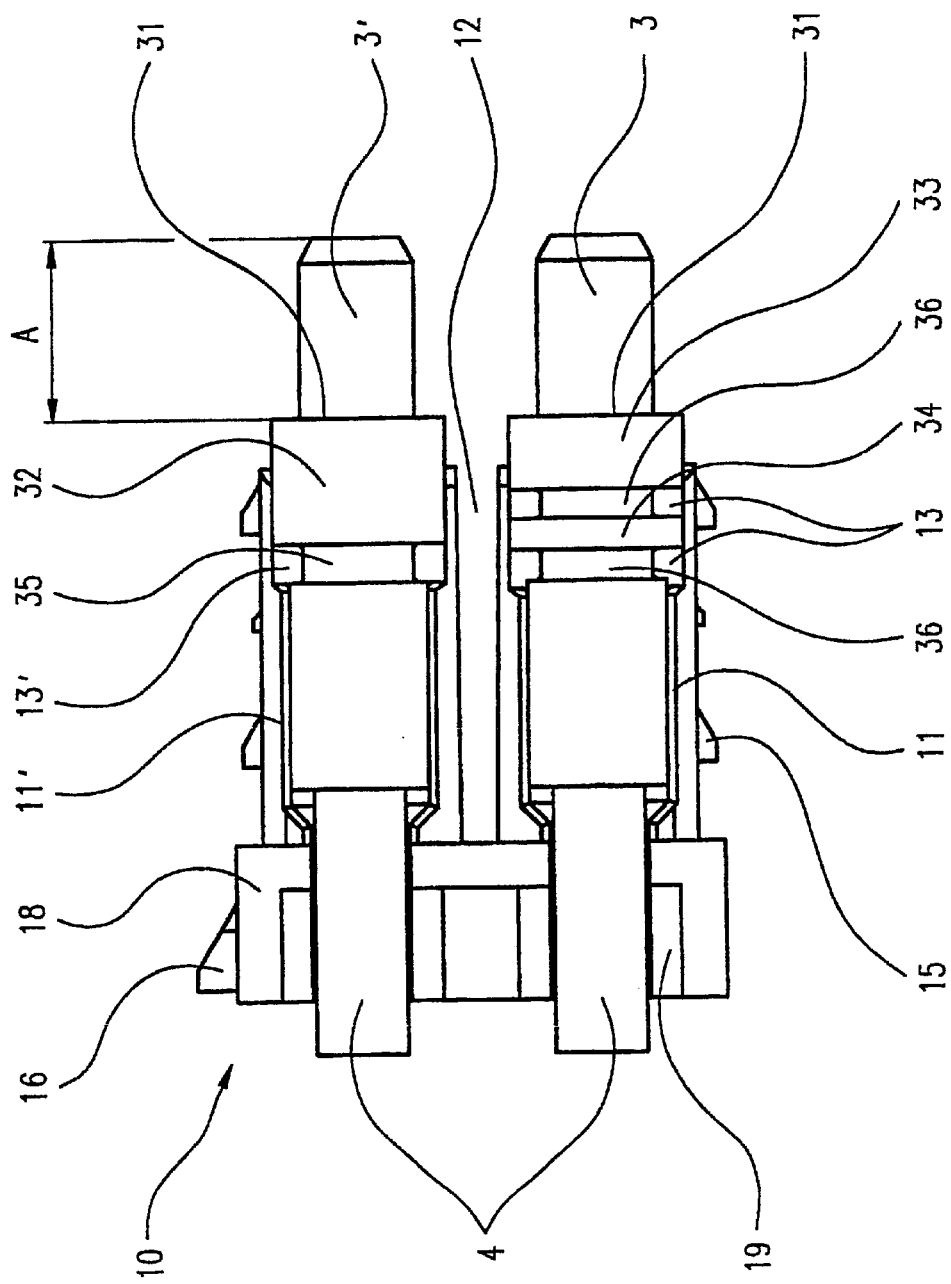
FIG. 4 shows a plan view of the mounting part with ferrules.

FIG. 4 shows a plan view of the mounting part 10 and ferrules 3, 3', inserted in the latter, with optical waveguides 4 again held therein.

This version is provided for a modular system plug-in connectors with a higher number of poles in which a surrounding casing 20 around the mounting part 10 can be dispensed with. Both ferrules 3, 3' are designed as metallic sleeves and are crimped directly onto the fiber by means of a crimping operation and also onto the cladding of the optical waveguide 4.

By forming a simple collar 32 or a double collar 33, 34 out of the preform of the ferrules 3, 3' and also by means of recesses 35, 36, the ferrules are provided with mechanical codings that make it possible to insert only into a matching negative form.

The matching counterpieces to the codings are provided in the two chambers 11, 11' of the mounting part 10.

For this purpose, there is formed on in the chamber 11' in the front plug region a transverse rib 13' into which only the recess 35 of the fiber end sleeve 3' can be inserted.

Formed on in the chamber 11 in the front plug region are two transverse ribs 13 between which only the ferrules 3 having the narrow collar 34 and the recesses 36 on both sides thereof can be inserted.

On the plug side of the ferrules, it is possible to perceive the terminating edges of collar 32 and 33 that are formed perpendicularly to the plug direction and that each form a reference surface 31 that is at a defined distance (A) from the end face of the ferrules.

When assembled with a matchingly shaped counterplug, its reference surface comes up against the reference surface 31 and a defined distance of the end faces of the two ferrules is ensured so that manufacturing tolerances of the casing surrounding the two ferrules are eliminated.

Figure 5A:
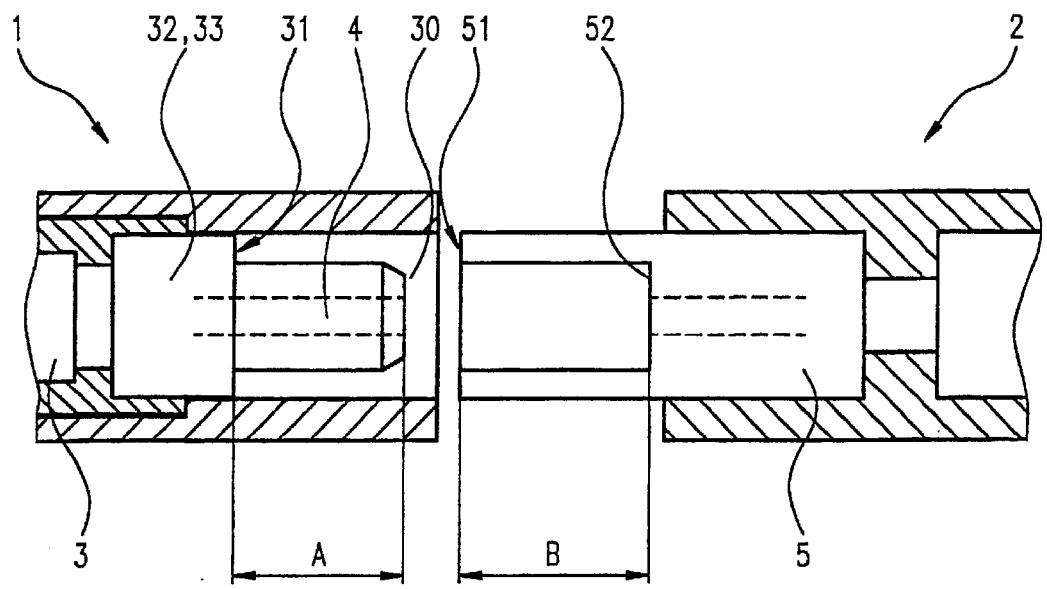
FIG. 5a shows a sectional view of the not connected plug-in connector with a counterplug.

FIG. 5a shows in a sectional view the ferrule 3, which is held within the plug-in connector 1. The ferrule is formed with a collar 32, 33 and a perpendicularly reference surface 31 and a defined distance A between the reference surface and the end face 30.

A ferrule 5 with an according form to the ferrule 3 is held within the counterplug 2 wherein the defined distance B is between the inner end face 52 and the reference surface 51.

Figure 5B:
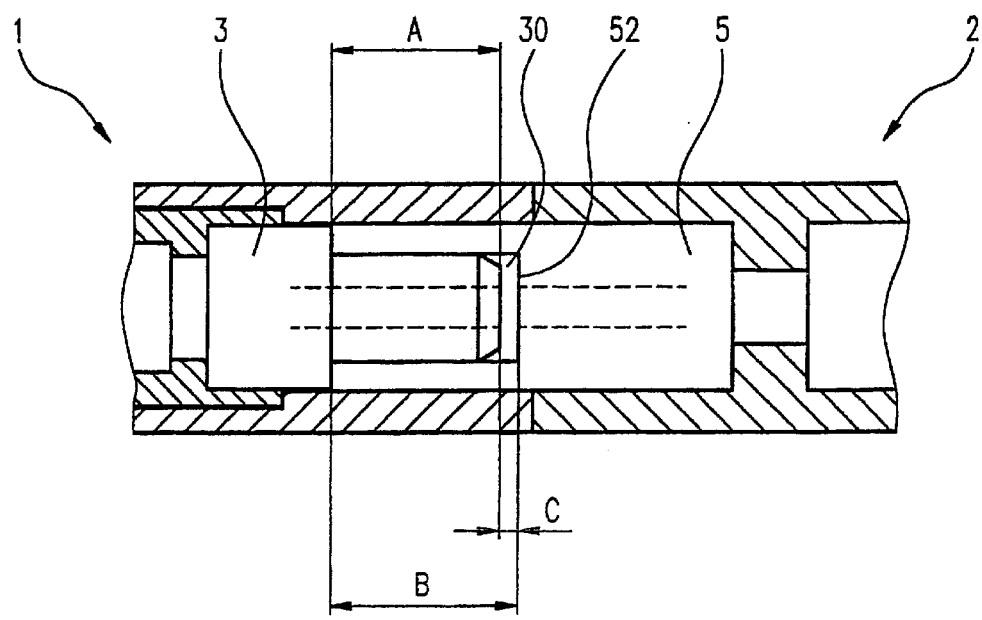
FIG. 5b shows a sectional view of the connected plug-in connector with a counterplug.

FIG. 5b shows in a sectional view the connected plug-in connectors 1, 3 wherein between the both reference surfaces 30, 52 is a defined distance C for an optimized signal transmission.

Figure 6:
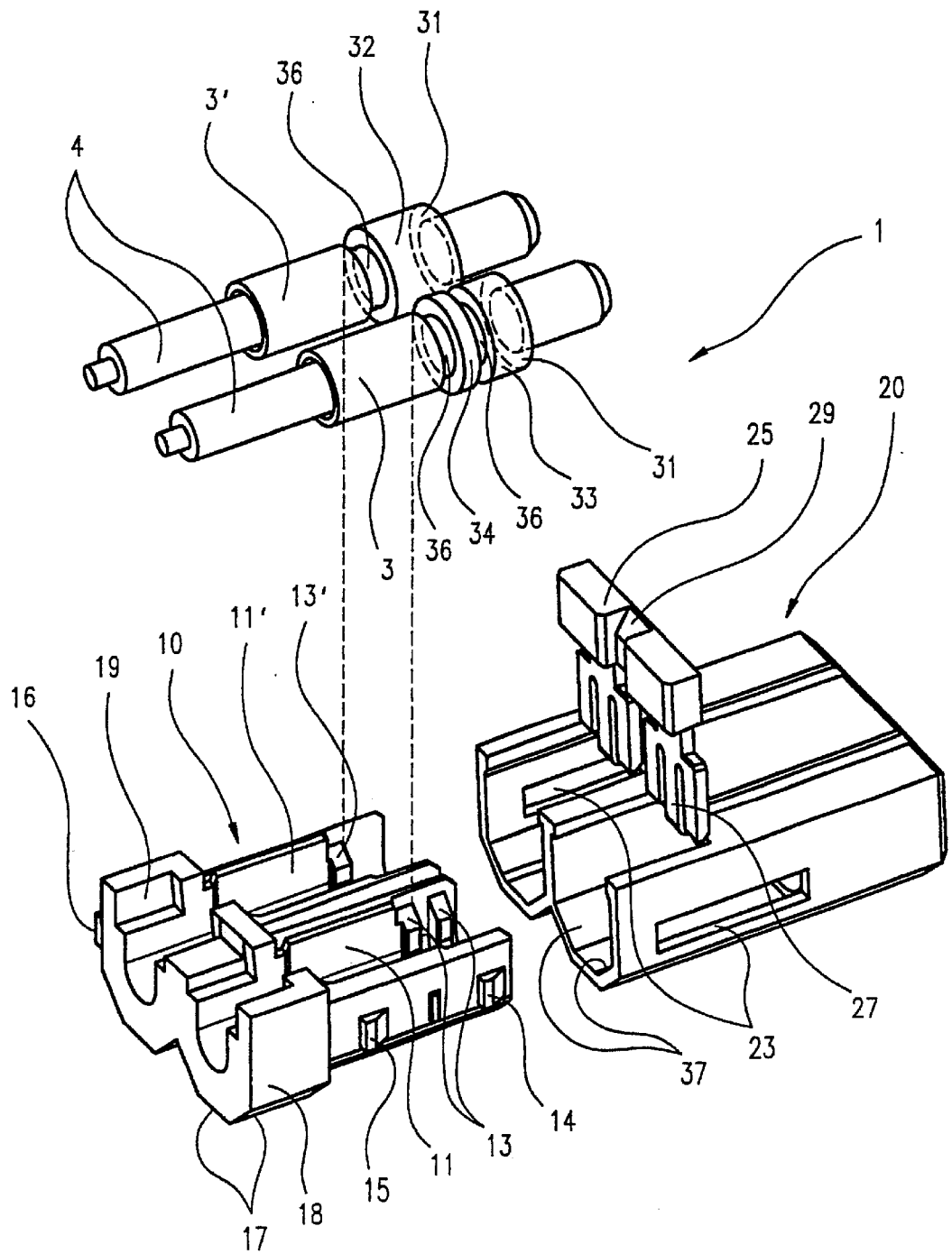
FIG. 6 shows an exploded, perspective view of the optical plug-in connector.

FIG. 6 shows a perspective and exploded view of a plug-in connector comprising the components: casing 20, mounting part 10 and also the ferrules 3, 3' in which the optical waveguides 4 are held.

When the plug-in connector is assembled, the ferrules 3, 3' provided with the optical waveguides are first inserted into the half open chambers 11, 11' and are clamped therein by a matching dimensional accuracy and forming of the chamber walls.

Then the mounting part 10 with the ferrules is pushed into the casing 20, in which process the latching lug 14 first latches into the recess 23 and effects a preliminary latching between mounting part and plug casing. When pushed further in, the latching lug 14 slides further forward in the recess until the second latching lug 15 likewise latches in the recess 23.

The mounting part 10 is consequently positively held up to the stop in the casing 20, the region 18 adjoining the external contours of the casing 20 flushly.

When the second latching means with the latching block 25 is swung down, casing 20 and mounting part 10 are finally latched, but are releasable again.

Provided as a further type of mounting, the mounting part 10 is first preliminarily latched by means of the latching means comprising latching lug 14 and recess 23 in the plug casing 20, then the ferrules with the optical waveguides are inserted into the chambers 11, 11' of the mounting part, the mounting part and casing are subsequently pushed together and are latched to one another by means of the second latching means. This has the advantage that, to assemble the optical plug-in connectors, mounting part and plug casing are already delivered as one part and only the ferrules have to be inserted.

What is claimed is:

1. An optical plug-in connector having optical waveguides held in ferrules for the pluggable connection to a counterplug, wherein the plug-in connector has a mounting part for at least one optical waveguide held in a ferrule, wherein the ferrule has a reference surface formed by a collar with a defined distance (A) between the reference surface and an end face of the optical waveguide, wherein, when the plug-in connector is plugged together with a counterplug, the reference surface comes to a stop at a reference surface of a ferrule of the counterplug, and the end face of the optical waveguide and an inner face surface of the counterplug are fixed in a defined distance (C).

2. An optical plug-in connector as claimed in claim 1, wherein the mounting part can be inserted into a casing.

3. An optical plug-in connector according to claim 2, wherein the mounting part and the casing have polarization means.

4. An optical plug-in connector as claimed in claim 2, wherein the mounting part and the casing are provided with latching means, wherein the mounting part has, at narrow sides, two latching lugs that are disposed in each case behind one another in the insertion direction and spaced apart and that engage in recesses in the casing, wherein, when the first latching lugs are inserted, they effect a preliminary latching between the mounting part and the casing and wherein, when pushed further in, the second latching lugs enter the recesses and finally latch the mounting part and the casing to one another.

5. An optical plug-in connector as claimed in claim 2, wherein there is provided on the casing a further latching means with a latching block that engages in a recess in the mounting part and wherein the latching block is held by means of film hinges on the casing.

6. An optical plug-in connector as claimed in claim 1, wherein the mounting part is provided with a coding means that are formed as transverse ribs that engage in recesses in the ferrule of the counterplug.

* * * * *